US009651126B2

(12) United States Patent
Lang et al.

(10) Patent No.: US 9,651,126 B2
(45) Date of Patent: May 16, 2017

(54) CONE BRAKE LOAD LIMITER METHOD AND APPARATUS

(75) Inventors: David J. Lang, Rockford, IL (US); James M. Regan, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1633 days.

(21) Appl. No.: 12/894,542

(22) Filed: Sep. 30, 2010

(65) Prior Publication Data

US 2012/0080283 A1 Apr. 5, 2012

(51) Int. Cl.
*F16H 25/20* (2006.01)
*B64C 13/28* (2006.01)
*F16D 59/00* (2006.01)
*F16H 25/24* (2006.01)
*F16D 67/00* (2006.01)
*F16D 65/02* (2006.01)
*F16D 125/36* (2012.01)
*F16D 127/00* (2012.01)

(52) U.S. Cl.
CPC ......... *F16H 25/2021* (2013.01); *B64C 13/28* (2013.01); *F16D 59/00* (2013.01); *F16D 67/00* (2013.01); *F16H 25/2454* (2013.01); *F16D 2065/024* (2013.01); *F16D 2125/36* (2013.01); *F16D 2127/005* (2013.01); *Y10T 29/49826* (2015.01)

(58) Field of Classification Search
CPC .................................................. F16H 25/2021
USPC .......... 192/223.3, 54.52, 35, 93 A; 188/72.1, 188/72.7
See application file for complete search history.

(56) References Cited

U.S. PATENT DOCUMENTS

| 2,161,398 | A |   | 6/1939  | Yingling            |         |
|-----------|---|---|---------|---------------------|---------|
| 3,273,674 | A |   | 9/1966  | Snyder              |         |
| 3,722,641 | A |   | 3/1973  | Kusiak              |         |
| 3,822,768 | A |   | 7/1974  | Sebulke             |         |
| 3,835,967 | A | * | 9/1974  | Kerr                | 188/134 |
| 4,022,299 | A |   | 5/1977  | Haraikawa           |         |
| 4,176,733 | A | * | 12/1979 | Twickler            | 188/134 |
| 4,480,733 | A |   | 11/1984 | Grimm               |         |
| 4,483,429 | A |   | 11/1984 | Tiedeman            |         |
| 4,582,187 | A |   | 4/1986  | Sekella             |         |
| 4,697,672 | A |   | 10/1987 | Linton              |         |
| 4,850,458 | A |   | 7/1989  | Allan et al.        |         |

(Continued)

FOREIGN PATENT DOCUMENTS

| EP | 550261  | 7/1993  |
|----|---------|---------|
| EP | 1378685 | 4/2006  |
| FR | 2424445 | 11/1979 |

OTHER PUBLICATIONS

EP Search Report dated May 31, 2012.

(Continued)

*Primary Examiner* — Stacey Fluhart
(74) *Attorney, Agent, or Firm* — Carlson, Gaskey & Olds

(57) ABSTRACT

A load limiter has a first disk for translating a first torque from an input and a second disk for translating a second torque from an output. Each of the first disk and the second disk has a ramp in which a torque transmitter, such as a ball is disposed. A first conical brake surface and a second conical brake surface disposed on the first disk or the second disk interact if the first torque and/or the second torque cause relative rotation between the first disk and the second disk.

19 Claims, 3 Drawing Sheets

(56) References Cited

U.S. PATENT DOCUMENTS

| | | | |
|---|---|---|---|
| 5,353,901 A | 10/1994 | Jacques et al. | |
| 5,487,452 A * | 1/1996 | Moinard et al. | 188/72.7 |
| 5,582,390 A * | 12/1996 | Russ | 244/99.2 |
| 5,651,435 A | 7/1997 | Perosky et al. | |
| 5,655,636 A | 8/1997 | Lang et al. | |
| 5,884,980 A | 3/1999 | Visser et al. | |
| 5,901,817 A * | 5/1999 | Gitnes | 188/134 |
| 5,943,911 A | 8/1999 | Beckerman | |
| 5,944,148 A | 8/1999 | Bae et al. | |
| 6,082,504 A * | 7/2000 | Organek et al. | 188/72.7 |
| 6,196,361 B1 | 3/2001 | Russ et al. | |
| 6,202,803 B1 | 3/2001 | Lang | |
| 6,312,215 B1 | 11/2001 | Walker | |
| 6,631,797 B2 | 10/2003 | Capewell | |
| 6,669,072 B2 * | 12/2003 | Burke et al. | 227/131 |
| 6,814,209 B1 | 11/2004 | Acosta | |
| 7,143,888 B2 | 12/2006 | Lang | |
| 7,159,701 B2 | 1/2007 | Graves | |
| 7,163,097 B2 | 1/2007 | Acosta | |
| 7,677,135 B2 | 3/2010 | Himmelmann | |
| 8,127,912 B2 | 3/2012 | Lang et al. | |
| 8,215,471 B2 * | 7/2012 | Wasser | 192/223.3 |
| 8,511,441 B2 | 8/2013 | Lang et al. | |
| 2002/0121421 A1 | 9/2002 | Capewell | |
| 2003/0205442 A9 | 11/2003 | Capewell | |
| 2004/0035653 A1 | 2/2004 | Christensen | |
| 2004/0040813 A1 | 3/2004 | Darby et al. | |
| 2005/0167229 A1 * | 8/2005 | Tsukada et al. | 192/54.52 |
| 2009/0277726 A1 | 11/2009 | Wasser | |
| 2010/0096498 A1 | 4/2010 | McKay | |

OTHER PUBLICATIONS

State Intellectual Property Office of People's Republic China, First Search, CN Application No. 201110370757.6 dated Dec. 21, 2014.

* cited by examiner

CONE BRAKE LOAD LIMITER METHOD AND APPARATUS

RELATED APPLICATION

This application relates to co-pending U.S. application Ser. No. 12/752,417, filed Apr. 1, 2010, and is incorporated herein by reference.

BACKGROUND

Numerous aircraft systems utilize actuators that contain load limiters. A load limiter protects the aircraft's structure by limiting the actuator output load to a pre-defined value in the event of an overload or a jam. The load limiter reacts to the torque of a power drive unit ("PDU") in the event of such a jam. If the PDU torque is input to a jammed actuated structure, the load limiter grounds the torque to the aircraft to prevent damage to the jammed actuated structure. The maximum load limiter setting is generally the limit load imposed on the actuator and determines the actuator's size, weight and envelope.

SUMMARY

As is disclosed herein, a load limiter has a first disk for translating a first torque from an input and a second disk for translating a second torque from an output. Each of the first disk and the second disk has a ramp in which a torque transmitter, such as a ball is disposed. A first conical brake surface and a second conical brake surface disposed on the first disk or the second disk interact if the first torque and/or the second torque cause relative rotation between the first disk and the second disk.

As is further disclosed herein, an actuator for an aircraft has an input shaft for transmitting a first torque and a no back attaching to the input shaft and passing the first torque. The actuator also has a first disk for translating the first torque from the no back and a second disk for translating a second torque from an output. Each of the first disk and the second disk has a ramp in which a torque transmitter, such as a ball is disposed. A grounded first conical brake surface and a second conical brake surface disposed on the first disk or the second disk interact if the first torque and/or the second torque cause relative rotation between the first disk and the second disk.

As is further disclosed herein, a method of assembling a load limiter includes providing a first disk and a second disk wherein the second disk has a first brake surface on an external surface thereof and wherein the first disk has a first shaped ramp and the second disk has a second shaped ramp. The first disk is preloaded against the second disk such that a torque transmitter is held between the first disk and the second disk in the first shaped ramp and in the second shaped ramp. The second brake surface is preloaded towards the first brake surface.

These and other features of the present invention can be best understood from the following specification and drawings, the following of which is a brief description.

DETAILED DESCRIPTION

Figure 1:
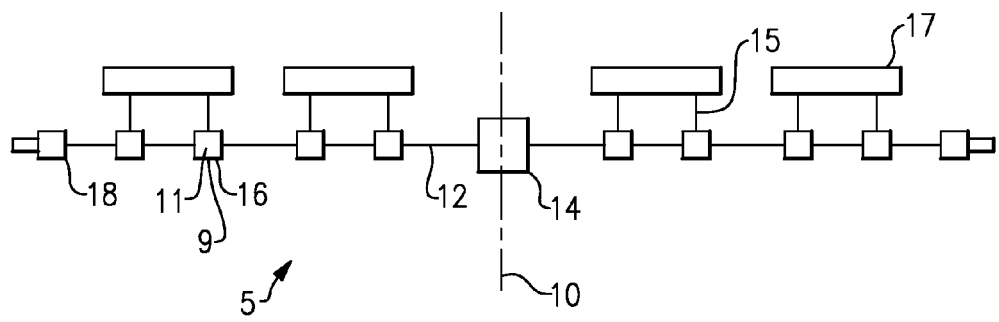
FIG. 1 is a schematic representation of an aircraft actuation system.

Referring now to FIG. 1, a schematic representation of an aircraft's actuation system 5 is shown. More than one actuator 11 may be arranged about a centerline 10 of an aircraft. Each actuator 11 is driven from the driveline torque shaft 12 and may be coupled to an actuated surface 17 by way of a linkage mechanism 15. The driveline torque shaft 12 is driven by a PDU, or power drive unit 14. The actuated surface 17 may be a movable aircraft surface such as a leading edge, or trailing edge of a wing. The actuated surface 17 generally imparts a reactive torque, or load on each respective actuator 11. This load is imparted into the actuators 11 and generally opposes the torque generated by the torque from driveline torque shaft 12. In the system without no backs 9, an input insufficient to oppose the actuated surface 17 (e.g., if the driveline torque shaft 12 or the PDU 14 were to fail) may cause the actuator 11 to back drive, thus causing the actuated surface 17 to displace from a desired position. Thus, each of the actuators 11 includes no backs 9 to prevent back drive of the actuators 11 and to prevent unwanted displacement from actuated surface 17. In this regard, the no backs 9 help maintain overall aircraft control. The system may further include position sensors 18 at either end of the driveline torque shaft 12 to monitor system position. A load limiter 16 protects the aircraft's structure by limiting the output of actuator 11. The load limiter 16 may also be used in systems that do not have no backs, such as asymmetry brake systems.

Figure 2:
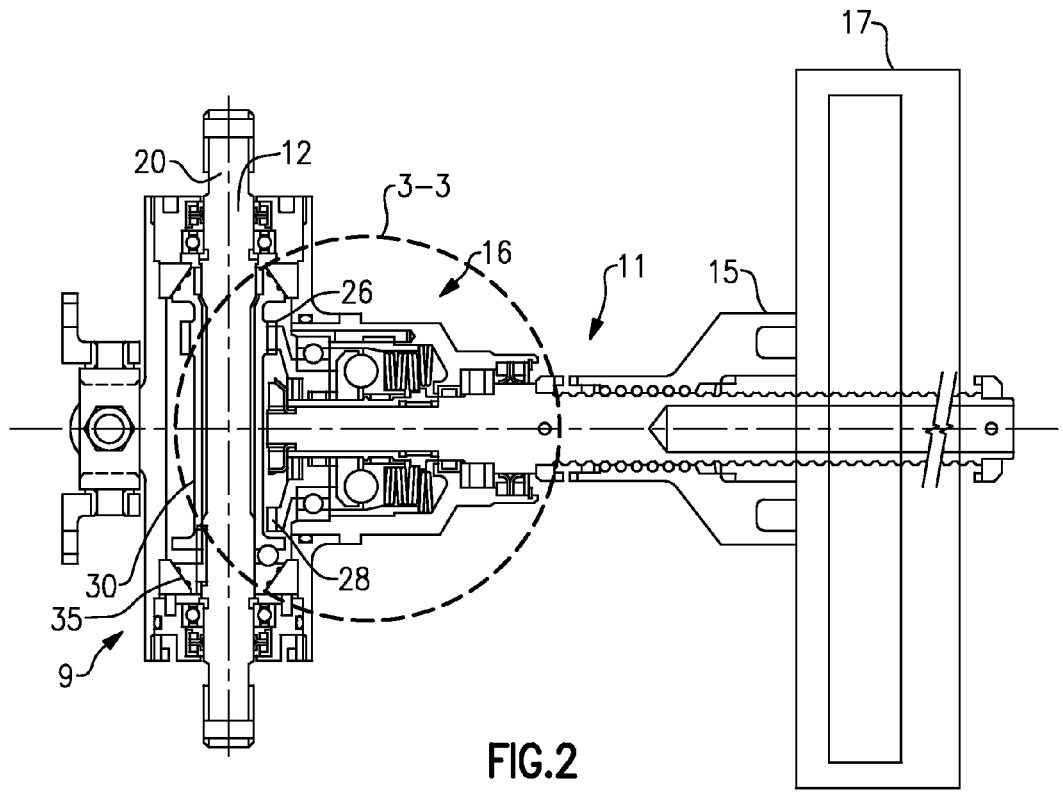
FIG. 2 is a schematic cutaway view of a cone brake load limiter as relates to an input shaft.

Referring now to FIG. 2, an actuator 11 including a load limiter 16 and no back 9 is shown. The load limiter 16 may be driven by the actuator input 20, which may be the driveline torque shaft 12. The driveline torque shaft 12 may rotate in forward and reverse directions. The driveline torque shaft 12 drives a no back output shaft 30. The no back output shaft 30 includes an output gear 26 and a face gear 28 that is in direct communication with the load limiter 16 that is shown in more detail in FIG. 3. The load limiter 16 is coupled to the actuated surface 17 by way of the actuator 11 and linkage mechanism 15 (or actuator ball screw and ball nut assembly as shown in FIG. 2). The no back 9 includes a cone brake 35 that is actuated if the input torque passed through actuator input 20 is exceeded by torque provided through linkage mechanism 15 by the actuated surface 17 in an aiding load direction.

Figure 3:
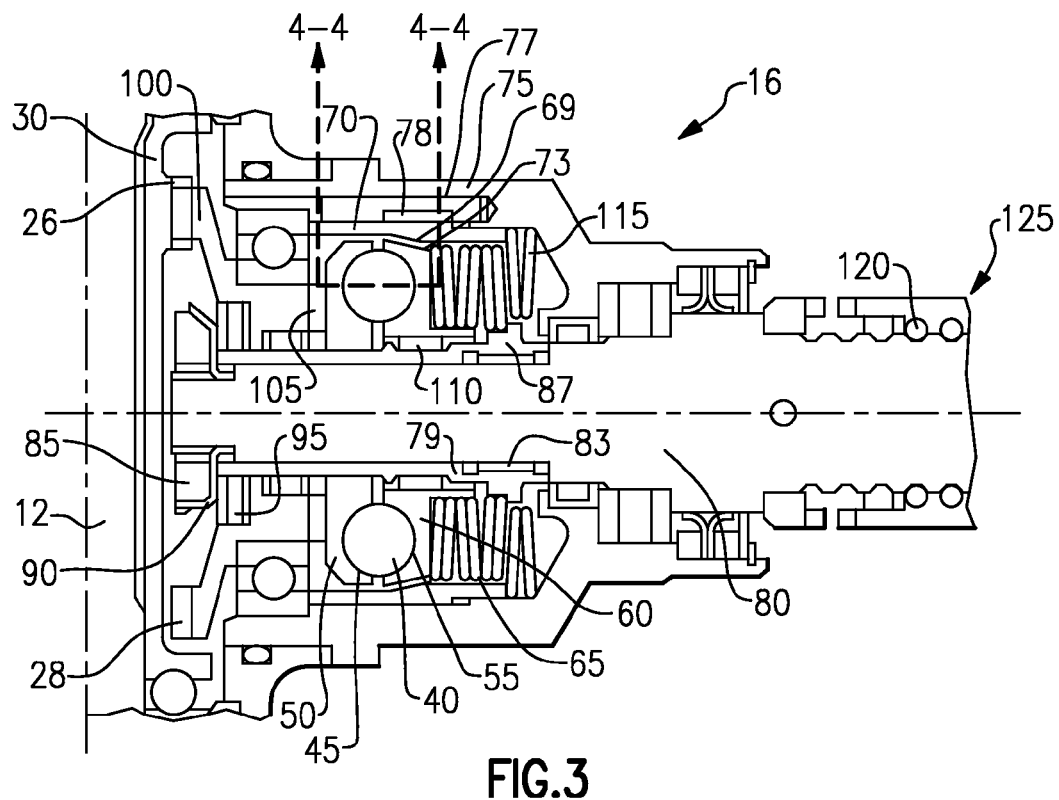
FIG. 3 is a view taken along the line 3-3 of FIG. 2.

Referring now to FIG. 3, the load limiter 16 uses a set of balls 40, also referred to generally as torque transmitters, disposed within a left ball ramp 45 disposed in a left disk 50 and a right ball ramp 55 disposed in a right disc 60 and the first spring set 65, which may be conical springs such as Belleville washers or the like, to limit torque and engage a conical brake surface 69 mounted in cylinder 70 to ground excess torque in case of the jam to the housing structure 75. The cylinder 70 is mounted for axial translation in the housing structure 75 and is limited against rotational movement by pins 77 and slots 78. An output shaft 79 is mounted between the right disc 60 and a ball screw shaft 80 and rotates with the ball screw shaft 80 via spline 83. The conical brake surface 69 closely fits about an outer cylindrical cone brake surface 73 of the right disk 60.

The spring set 65 is preloaded to push the right disk 60 and the left disk 50 together to entrain the balls 40, which may move within the right ball ramp 55 and the left ball ramp 45 to separate the right disk 60 and the left disk 50 (see FIGS. 4A-C) if the preload is exceeded as will be discussed hereinbelow. The spring set 65 preload is set by entrapping the spring set 65 on the ball screw shaft 80 between a flange 87 on the output shaft 79 and a spanner 85 or nut, a lock washer 90, thrust bearing 95, and input gear 100.

The input from the face gear 28 drives the left disk 50 via input gear 100 and tangs 105. The left disk 50 drives the balls 40 that, in turn, drive the right disk 60 and the ball screw shaft 80 via pins 110. A second spring set 115, which may also be Belleville washers, is disposed between the housing structure 75 and the cylinder 70 urge the cone brake surface 69 axially toward the left towards the input gear 100 and towards the outer surface 73 of the right disk 60. Motion of the ball screw shaft 80 drives the balls 120 in ball screw 125 to move the actuated surface 17 (see FIG. 2) as is known in the art. The ball screw 125 also translates torque from the actuated surface 17 back to the load limiter 16.

Figure 4A:
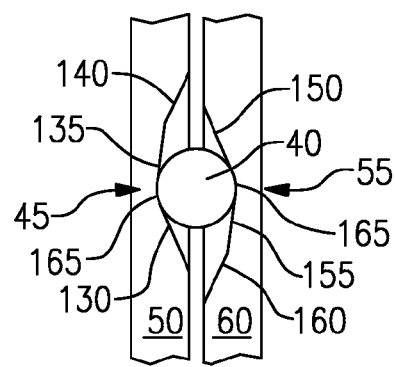
FIG. 4A is a view taken along the lines 4-4 of FIG. 3 in a static condition.
Figures 4B, 4C:
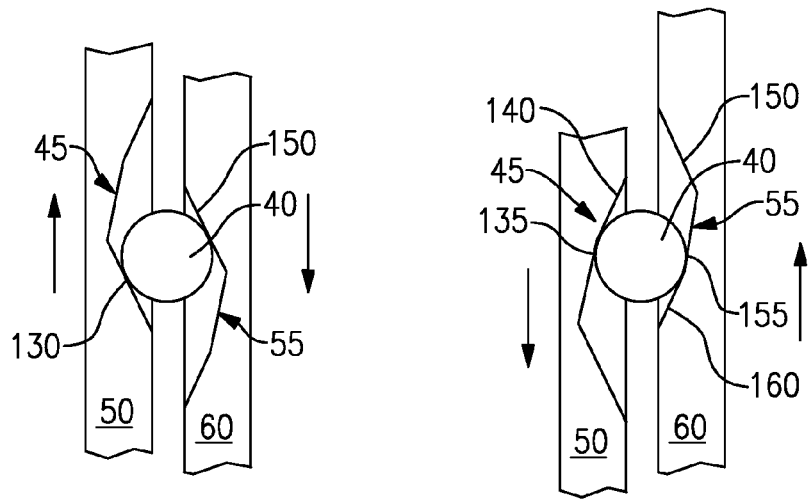
FIG. 4B is a view of FIG. 3 taken along the lines 4-4 in a compression load condition.
FIG. 4C is a view taken along the lines 4-4 of FIG. 3 in a tensile load condition.

Referring now to FIG. 4A-C, operation and construction of the ball ramps 45 and 55 are shown. The ball ramp 45 in the left disk 50 has a constant, steeply angled lower first face 130, a flatter angled upper second face 135 relative to the first face 130 and a steeper angled third face 140 relative to the second face 135. The ball ramp 55 in the right disk 60 is upside down relative to the ball ramp 45 in the left disk 50, e.g., the ball ramp 55 has a constant, steeply angled upper fourth face 150, a flatter angled lower fifth face 155 relative to the fourth face 150 and a steeper angled sixth face 160 relative to the fifth face 155.

In FIG. 4A, the balls 40 are grounded in the low points 165 in each ball ramp and the torque of the driveline torque shaft 12 is transmitted directly to the actuated surface 17, and vice-versa, via the load limiter 16 and actuator 11. Because there is no relative rotation between the right disk 60 and the left disk 50, the balls 40 stay seated and torque passes directly therethrough.

Referring now to FIG. 4B, a compressive load impinges on the load limiter 16 via the actuator 11. A compressive load occurs if the actuated surface 17 tends to push the ball screw 125 towards the balls 40. If a compressive load occurs such that there is relative rotation between the left disk 50 and the right disk 60, the balls 40 are forced to travel up first face 130 and fourth face 150 to push the right disk 60 and left disk 50 away from each other. As the balls 40 move up first face 130 and fourth face 150, the outer surface 73 of the right disk 60 is pushed into brake surface 69 of the cylinder 70. After this contact, the second spring set 115 has a high spring preload such that it prevents translation of the cylinder 70 and any further rotation of right disk 60. Therefore, any PDU 14 torque above the trip torque goes into cylinder 70 and is grounded into housing structure 75 and rotation of the ball screw 80 stops.

Referring now to FIG. 4C, a tension load impinges on the load limiter via the driveline torque shaft 12 and linkage mechanism 15. A tension load occurs when a load tends to pull the ball screw 125 away from the ramps. If a tension load occurs such that there is relative rotation between the left disk 50 and the right disk 60, the balls 40 are first forced to travel up second face 135 and fifth face 155 and then forced to travel up third face 140 and sixth face 160 to push the right disk 60 and left disk 50 away from each other. As the balls 40 move up second face 135 and fifth face 155, the outer surface 73 of the right disk 60 contacts the brake surface 69 of the cylinder 70 with the relatively shallow angle of the second face 135 and fifth face 155. Continued rotation of disc 50 will move the balls 40 further up the second face 135 and fifth face 155 by compressing springs 115. The disc 50 will continue to rotate until the balls move up third face 140 and sixth face 160. After this contact, the second spring set 115 allows full PDU 14 grounding torque above the trip torque to go into cylinder 70 and is grounded into the housing structure 75 and rotation of the ball screw 80 stops. The shallow angle of the second face 135 and fifth face 155 allows a lower load limiter trip load than the direction of rotation shown in FIG. 4B. Contacting surfaces 140 and 160 with continued rotation of disc 50 prevent excessive axial loads from being generated within the actuator. Once the cone brake is engaged, the brake gain which is greater than 1.0 prevents rotation of surface 73 with respect to surface 69. The gain is determined by the surfaces (130, 150, 135, 155, 140, 160), pitch radius to center of ball 40, pitch radius to surfaces 69 and 70, cone angle of surface 69 and 73, and coefficient of friction. The surfaces 135 and 155 allow the balls to engage surface 73 and 69 prior to contacting surfaces 140 and 160 by compressing second spring set 115. This prevents excessive axial loads on the actuator that would occur if surfaces 140 and 150 were non-existent. Having the full PDU 14 jam torque occur on surfaces 140, 160, which are the same ramp angle as surfaces 130 and 150, ensures the PDU 14 jam torque in either direction will produce the same axial load on the actuator.

In the example shown herein, the compressive load trip setting is higher than the tensile load trip setting and uses a constant ball ramp angle to comply with design requirements. The angles and number of faces or curves in the ball ramps 45, 55 may be varied as may be required by designers and are contemplated herein.

Figure 5:
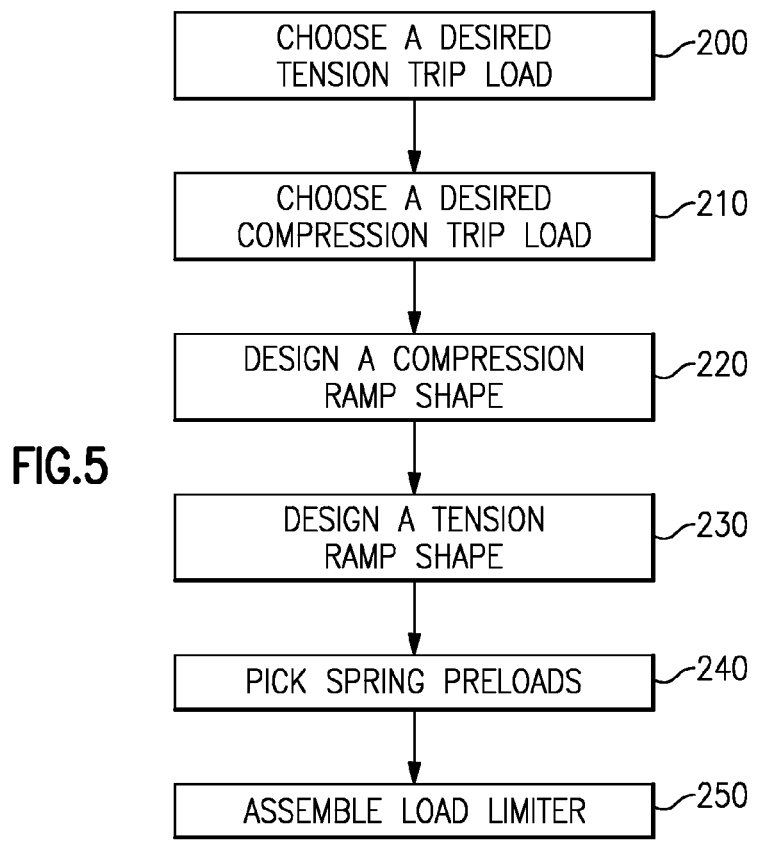
FIG. 5 depicts a method of assembling the load limiter.

Referring now to FIG. 5, a method of assembling the load limiter 16 is shown. In step 200, an aircraft designer chooses a desired tension trip load if designing an actuating system 5 that may encounter situations if the disks 50, 60 tend to be pulled apart by a jam or other malfunction. In step 210, the aircraft designer chooses a desired compression trip load to deal with jams that compress the disks 50, 60. In step 220, the designer would design a proper shape for the ramps 45, 55 if a compressive load is encountered and in step 230, the designer would design a proper shape for the ramps 45, 55 if a tensile load is encountered. While carrying out steps 220 and 230, the designer would be choosing a spring preload (step 240). The load limiter 16 is then assembled (step 250) by utilizing the properly shaped ramps 45, 55, the first and second spring sets 65, 115 and the appropriate spring preloads.

The load limiter 16 trip setting may be different depending on whether the trip load is in a compression or tension mode. The different settings are accomplished by having different initial ramp angles on the ball ramps. For instance, in FIG. 4A, the ball 40 is disposed between the plates and when operation is normal the plates are not extended away from each other and do not contact the brake. This changing the ball ramp angles on the tension side load limiter once the cone brake surfaces are engaged allows the final axial load generated by grounding the PDU torque to structure to be the same as the compression side load limiter. This minimizes the size of the load limiter.

In some applications, the load limiter 16 is located upstream of the actuator 11 and controls the torque into the actuator 11. However, it has been discovered that the cold temperature drag torque and torque variation due to gear efficiency increases the maximum load limiter setting for the actuator 11 and the aircraft structure (not shown). The maximum load limiter setting is generally the limit load imposed on the actuator 11 and determines the actuator size, weight and envelope. In FIG. 2, the load limiter 16 is positioned downstream of the actuator input 20 and the gears 26, 28 where it is unaffected by the input shaft drag torque and gear efficiency to thereby allow for a smaller load limiter that is desirable.

Moreover, a typical load limiter utilizes a ball ramp that is preloaded to measure torque and a set of friction plates to transfer excessive PDU torque to an aircraft's structure in the event of a jam. The load limiter 16 uses a set of cone surfaces to similarly transfer the PDU torque to the aircraft's structure. The use of cone brake surfaces and Belleville springs instead of the friction plates and helical springs, allows the cone brake load limiter to be more compact with higher loaded actuators.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A load limiter comprising:
    a first disk for translating a first torque from an input and having a first ramp;
    a second disk for translating a second torque from an output and having a second ramp;
    at least one torque transmitter disposed between said first disk and said second disk between said first ramp and said second ramp;
    a first conical brake surface; and
    a second conical brake surface on one of said first disk or said second disk for interacting with said first conical surface if there is relative rotation between said first disk and said second disk;
    wherein
        the first ramp comprises at least a first face oriented at a first angle and a second face oriented at a second, different angle,
        the at least one torque transmitter moving along said first face responsive to a first force that causes the relative rotation between said first disk and said second disk in a first direction, and
        the at least one torque transmitter moving along said second face responsive to a second force that causes the relative rotation between said first disk and said second disk in a second, different direction.

2. The load limiter of claim 1 wherein said first disk and said second disk are pushed together by a preload force.

3. The load limiter of claim 2 wherein said preload force is provided by conical springs.

4. The load limiter of claim 1, wherein
    the first ramp comprises a third face oriented at a third angle; and
    the at least one torque transmitter moves along the third face subsequent to moving along the second face during the relative rotation between said first disk and said second disk in said second direction.

5. The load limiter of claim 1, wherein
    the second ramp comprises at least a third face oriented at a third angle and a fourth face oriented at a fourth angle that is different than the third angle;
    the at least one torque transmitter moves along said third face responsive to the first force that causes the relative rotation between said first disk and said second disk in the first direction; and
    the at least one torque transmitter moves along said fourth face responsive to the second force that causes the relative rotation between said first disk and said second disk in the second direction.

6. The load limiter of claim 5, wherein
    the third angle is approximately equal to the first angle; and
    the fourth angle is approximately equal to the second angle.

7. The load limiter of claim 1, wherein
    the torque transmitter is situated at an interface between the first face and the second face in a first condition in which torque is transmitted through the first and second disks;
    there is a first spacing between the first and second disks when the torque transmitter is situated at the interface; and
    there is a second, greater spacing between the first and second disks when the torque transmitter is received against one of the first face or the second face responsive to the relative rotation between the first disk and the second disk.

8. The load limiter of claim 1, wherein
    the first angle requires a first magnitude of the first force for the torque transmitter to begin to move along the first face; and
    the second angle requires a second, smaller magnitude of the second force for the torque transmitter to begin to move along the second face.

9. The load limiter of claim 8, wherein
    the first ramp comprises a third face oriented at a third angle;
    the at least one torque transmitter moves along the third face subsequent to moving along the second face during the relative rotation between said first disk and said second disk in said second direction; and
    the third angle is approximately equal to the first angle;
    the third angle requires a third magnitude of the second force for the torque transmitter to move along the third face; and
    the third magnitude of the second force is approximately equal to the first magnitude of the first force.

10. The load limiter of claim 1, comprising a plurality of torque transmitters between the first disk and the second disk, each torque transmitter being received between corresponding first and second ramps.

11. An actuation system for an aircraft comprising:
    an input shaft for transmitting a first torque;
    a no back attaching to said input shaft and transmitting said first torque;
    a first disk receiving said first torque from said no back and having a first ramp;
    a second disk for translating a second torque from an output and having a second ramp;
    a torque transmitter disposed between said first disk and said second disk between said first ramp and said second ramp;
    a first conical brake surface situated to remain in a fixed position; and
    a second conical brake surface on one of said first disk or said second disk for interacting with said first conical brake surface if there is relative rotation between said first disk and said second disk;
wherein
the first ramp comprises at least a first face oriented at a first angle and a second face oriented at a second, different angle,
the at least one torque transmitter moves along said first face responsive to a first force that causes the relative rotation between said first disk and said second disk in a first direction, and
the at least one torque transmitter moves along said second face responsive to a second force that causes the relative rotation between said first disk and said second disk in a second, different direction.

12. The actuation system of claim 11 wherein said first disk and said second disk are pushed together by conical springs.

13. The actuation system of claim 11 wherein said first conical brake surface is attached to a body that is axially movable though opposed by a spring attaching to said ground.

14. The actuation system of claim 11, wherein
the first ramp comprises a third face oriented at a third angle; and
the torque transmitter moves along the third face subsequent to moving along the second face during the relative rotation between said first disk and said second disk in said second direction.

15. The actuation system of claim 11, wherein
the second ramp comprises at least a third face oriented at a third angle and a fourth face oriented at a fourth angle that is different than the third angle;
the torque transmitter moves along said third face responsive to the first force that causes the relative rotation between said first disk and said second disk in the first direction; and
the torque transmitter moves along said fourth face responsive to the second force that causes the relative rotation between said first disk and said second disk in the second direction.

16. The actuation system of claim 15, wherein
the third angle is approximately equal to the first angle; and
the fourth angle is approximately equal to the second angle.

17. The actuation system of claim 11, wherein
the torque transmitter is situated at an interface between the first face and the second face in a first condition in which torque is transmitted through the first and second disks;
there is a first spacing between the first and second disks when the torque transmitter is situated at the interface; and
there is a second, greater spacing between the first and second disks when the torque transmitter is received against one of the first face or the second face responsive to the relative rotation between the first disk and the second disk.

18. The actuation system of claim 11, wherein
the first angle requires a first magnitude of the first force for the torque transmitter to begin to move along the first face; and
the second angle requires a second, smaller magnitude of the second force for the torque transmitter to begin to move along the second face.

19. The actuation system of claim 18, wherein
the first ramp comprises a third face oriented at a third angle;
the at least one torque transmitter moves along the third face subsequent to moving along the second face during the relative rotation between said first disk and said second disk in said second direction; and
the third angle is approximately equal to the first angle;
the third angle requires a third magnitude of the second force for the torque transmitter to move along the third face; and
the third magnitude of the second force is approximately equal to the first magnitude of the first force.

* * * * *

UNITED STATES PATENT AND TRADEMARK OFFICE
CERTIFICATE OF CORRECTION

PATENT NO. : 9,651,126 B2
APPLICATION NO. : 12/894542
DATED : May 16, 2017
INVENTOR(S) : David J. Lang and James M. Regan It is certified that error appears in the above-identified patent and that said Letters Patent is hereby corrected as shown below:

In the Claims

In Claim 11, Column 7, Line 7; before "at least one" delete "the"

In Claim 11, Column 7, Line 11; before "at least one" delete "the"

In Claim 13, Column 7, Line 20; after "attaching to" replace "said" with --a--

Signed and Sealed this
Fifteenth Day of August, 2017

Joseph Matal
*Performing the Functions and Duties of the
Under Secretary of Commerce for Intellectual Property and
Director of the United States Patent and Trademark Office*